(12) United States Patent
Yamauchi et al.

(10) Patent No.: US 11,217,975 B2
(45) Date of Patent: Jan. 4, 2022

(54) PROTECTIVE TUBE CONNECTION STRUCTURE

(71) Applicant: Yazaki Corporation, Tokyo (JP)

(72) Inventors: Akinori Yamauchi, Aichi (JP); Mikiya Matsuoka, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 42 days.

(21) Appl. No.: 16/743,676

(22) Filed: Jan. 15, 2020

(65) Prior Publication Data

US 2020/0251890 A1 Aug. 6, 2020

(30) Foreign Application Priority Data

Jan. 31, 2019 (JP) .............................. JP2019-015830

(51) Int. Cl.
| | |
|---|---|
| *H02G 3/04* | (2006.01) |
| *B60R 16/02* | (2006.01) |
| *H02G 3/06* | (2006.01) |
| *H02G 3/30* | (2006.01) |
| *H01B 7/00* | (2006.01) |

(52) U.S. Cl.
CPC .......... *H02G 3/0462* (2013.01); *B60R 16/02* (2013.01); *B60R 16/0215* (2013.01); *H02G 3/0406* (2013.01); *H02G 3/0468* (2013.01); *H02G 3/0691* (2013.01); *H02G 3/30* (2013.01); *B60R 16/0207* (2013.01); *H01B 7/0045* (2013.01)

(58) Field of Classification Search
CPC .. H02G 3/0406; H02G 3/0462; H02G 3/0469; H02G 3/0691; H02G 3/30; B60R 16/02; B60R 16/0215
See application file for complete search history.

(56) References Cited

U.S. PATENT DOCUMENTS

| | | | |
|---|---|---|---|
| 7,109,420 B2 * | 9/2006 | Arai .................... | B60R 16/0215 174/481 |
| 2004/0154817 A1 * | 8/2004 | Sudo ........................ | H02G 3/06 174/481 |
| 2005/0217888 A1 * | 10/2005 | Arai ...................... | H02G 3/0418 174/72 A |

(Continued)

FOREIGN PATENT DOCUMENTS

| | | | | |
|---|---|---|---|---|
| JP | 2004229351 A | * | 8/2004 | ............... H02G 3/04 |
| JP | 2005065399 A | * | 3/2005 | ............... H02G 3/04 |

(Continued)

*Primary Examiner* — Steven T Sawyer
*Assistant Examiner* — Paresh H Paghadal
(74) *Attorney, Agent, or Firm* — Sughrue Mion, PLLC

(57) ABSTRACT

A protective tube connection structure includes a protective tube through which an electric wire is inserted and has alternately large diameter portions and small diameter portions; and a covering member where an end portion of the protective tube is fixed, the electric wire led out from the end portion being disposed inside the body portion. A wire support portion is provided on a bottom plate portion vertically below the covering member such that the electric wire led out from the end portion of the protective tube is placed on the wire support portion at first and the wire support portion is located vertically above an inner surface of the small-diameter portion on an endmost side.

3 Claims, 6 Drawing Sheets

(56) References Cited

U.S. PATENT DOCUMENTS

| | | | |
|---|---|---|---|
| 2009/0211781 A1* | 8/2009 | Suzuki | B60R 16/0215 |
| | | | 174/101 |
| 2014/0213102 A1 | 7/2014 | Figie | |
| 2014/0331263 A1* | 11/2014 | Smadi | H04N 21/4126 |
| | | | 725/81 |
| 2015/0121658 A1* | 5/2015 | Kamigaichi | B60R 16/0215 |
| | | | 24/16 PB |
| 2016/0284440 A1 | 9/2016 | Adachi et al. | |
| 2019/0123530 A1* | 4/2019 | Tokuyama | H02G 3/0487 |
| 2020/0269778 A1* | 8/2020 | Komori | H02G 15/013 |

FOREIGN PATENT DOCUMENTS

| | | | | |
|---|---|---|---|---|
| JP | 2006-60934 A | | 3/2006 | |
| JP | 2006311785 A | * | 11/2006 | B60R 16/0215 |
| JP | 2012-143028 A | | 7/2012 | |
| JP | 2015033206 A | * | 2/2015 | H02G 3/04 |
| JP | 2016-027770 A | | 2/2016 | |
| JP | 2016-181961 A | | 10/2016 | |
| JP | 2018133872 A | * | 8/2018 | H02G 3/04 |
| WO | 2012/111182 A1 | | 8/2012 | |

* cited by examiner

PROTECTIVE TUBE CONNECTION STRUCTURE

CROSS-REFERENCE TO RELATED APPLICATIONS

This application is based on and claims priority under 35 USC 119 from Japanese Patent Application No. 2019-015830 filed on Jan. 31, 2019, the contents of which are incorporated herein by reference.

TECHNICAL FIELD

The present invention relates to a protective tube connection structure.

BACKGROUND ART

A large number of electric wires are disposed in a vehicle. Some of the electric wires are covered with a protector or a protective tube so as to prevent a physical force from being applied, from the outside in particular (see Patent Literature 1). As for the protective tube, a corrugated tube made of hard resin and formed in a bellows shape, in which large diameter portions and small diameter portions are alternately connected, is frequently used.

In a wiring structure of such a type of electric wire, as shown in FIG. 6A, an electric wire 505 is passed through a protector 501 and a harness tube (corrugated tube) 503. An end portion 507 of the harness tube 503 is loosely inserted into the protector. A tie band 509 fixes the protector 501 with the electric wire 505. In the wiring structure of the electric wire 505, a rib 517 serving as a restriction protrusion that rises toward a lid body 511 is provided on a bottom wall 515 of a body portion 513 facing the lid body 511. The rib 517 (abutment protrusion) abuts against a tip end of the end portion 507 of the harness tube 503, so as to restrict the end portion 507 of the harness tube 503 from entering the inside of the protector 501.

CITATION LIST

Patent Literature

Patent Literature 1: JP-A-2006-60934

SUMMARY OF INVENTION

However, even if the electric wire 505 is covered with the harness tube 503 or the protector 501 so as to be protected, an external force caused by vehicle vibration or the like during traveling may be transmitted. In particular, when the harness tube 503, in which the electric wire 505 inserted, is cut into a predetermined length and used, a cutting edge 519 may be formed at the tip end of the end portion 507. When the harness tube 503 is cut in a direction orthogonal to a central axis, the cutting edge 519 protrudes radially inward on a starting end side of the cutting direction, and protrudes radially outward on a terminal end side. Since the harness tube 503 is made of hard resin, the cutting edge 519 may be sharp. In particular, when the electric wire 505 is fixed (restrained) by the tie band in the protector, vibration of the protector 501 is transmitted to the electric wire 505 and the cutting edge 519 protruding radially inward may cause damage to an insulation coating 521 of the electric wire 505. The insulation coating 521 may also be damaged due to contact between the electric wire 505 and the rib 517.

The present invention has been made in view of the above circumstances, and an object thereof is to provide a protective tube connection structure which can reduce damage dealt to an electric wire due to vehicle vibration or the like.

The object of the present invention is achieved by the following configuration.

(1) A protective tube connection structure includes: a protective tube through which an electric wire is inserted and has alternately large diameter portions and small diameter portions; and a covering member where an end portion of the protective tube is fixed, the electric wire led out from the end portion being disposed inside the body portion. A wire support portion is provided on a bottom plate portion vertically below the covering member such that the electric wire led out from the end portion of the protective tube is placed on the wire support portion at first and the wire support portion is located vertically above an inner surface of the small-diameter portion on an endmost side.

According to the protective tube connection structure having the configuration (1), the wire support portion is provided on the bottom plate portion of the body portion of the covering member. The bottom plate portion is located vertically below the body portion. For example, an engagement rib protrudes upward in the vertical direction on the bottom plate portion. An upper end of the engagement rib enters and engages with an outer periphery of the small diameter portion which is formed in a valley shape between adjacent large diameter portions of the protective tube. The end portion of the protective tube fixed to the body portion of the covering member is slightly floated from the bottom plate portion due to the engagement rib. Therefore, the electric wire led out from the end portion of the protective tube is floated by a predetermined distance from the bottom plate portion. The bottom plate portion is provided with the wire support portion spaced apart from the end portion of the protective tube in a lead-out direction of the electric wire. Accordingly, the electric wire led out from the end portion of the protective tube is placed on the wire support portion at first. The wire support portion is located vertically above the inner surface of the small-diameter portion on the endmost side of the protective tube and thus provided on the bottom plate portion of the body portion. That is, the electric wire led out from the end portion of the protective tube is bent and inclined upward toward the wire support portion. Due to this inclination, the electric wire is disposed at a floating position spaced apart from the inner surface of the small diameter portion at the end portion of the protective tube. As a result, even when a cutting edge rises vertically upward from a lower edge of the small diameter portion, interference of the cutting edge with the electric wire is avoided or biting thereof is mitigated.

(2) The protective tube connection structure according to (1), in which an abutment protrusion is provided on the bottom plate portion of the covering member, and the abutment protrusion protrudes upward vertically from the bottom plate portion, and an upper end of the abutment protrusion is disposed vertically below the inner surface of the small diameter portion.

According to the protective tube connection structure having the configuration (2), the abutment protrusion protruding upward vertically from the bottom plate portion is provided between the end portion of the protective tube and the wire support portion. The upper end of the abutment protrusion is disposed vertically below the inner surface of the small diameter portion. Therefore, the electric wire led out from the end portion of the protective tube does not contact the upper end of the abutment protrusion. Accordingly, the electric wire is led out from the end portion of the protective tube and placed on the wire support portion at first. The abutment protrusion abuts against the end portion of the protective tube to restrict the end portion of the protective tube from further entering the inside of the covering member. The abutment protrusion is lower than the inner surface of the small diameter portion, and the electric wire led out from the end portion of the protective tube is placed on the wire support portion. Therefore, the abutment protrusion does not interfere with the electric wire. Accordingly, the abutment protrusion can reliably restrict the protective tube from entering the inside of the covering member.

(3) The protective tube connection structure according to (1) or (2), in which the wire support portion includes a flat placement surface provided along the bottom plate portion.

According to the protective tube connection structure having the configuration (3), the wire support portion includes the flat placement surface along the bottom plate portion. Since the placement surface is formed to be flat, the insulation coating is less likely to be damaged when the electric wire contacts the placement surface. That is, a pressing force per unit area received by the electric wire from the placement surface is smaller than a pressing force received in a case where a tip end of a rib is pointed. Accordingly, plastic deformation or damage is less likely to occur on the insulation coating of the electric wire.

(4) The protective tube connection structure according to (3), in which the placement surface is provided continuously with an inclined surface which is inclined downward toward the end portion.

According to the protective tube connection structure having the configuration (4), the inclined surface is continuously provided between the placement surface of the wire support portion and the end portion of the protective tube so as to be inclined downward from the placement surface toward the end portion. That is, the inclined surface is inclined upward from the end portion toward the placement surface of the wire support portion. Accordingly, the electric wire led out from the end portion of the protective tube contacts a corner portion of an obtuse angle formed by intersection of the placement surface and the inclined surface. As a result, the insulation coating of the electric wire is less likely to be deformed or damaged as compared with a case where the electric wire contacts a corner portion of a right angle or an acute angle.

(5) The protective tube connection structure according to any one of (1) to (4), in which the wire support portion includes a pair of band insertion holes so as to communicate two sides of a tie band wound along an outer periphery of the placed electric wire.

According to the protective tube connection structure having the configuration (5), the wire support portion includes a pair of band insertion holes on the placement surface on which the electric wire is placed. The two sides of the tie band wound along the outer periphery of the electric wire communicate through the pair of band insertion holes. That is, the wire support portion serves as a tie band fixing portion in which the electric wire is fixed to the placement surface by the tie band. As described above, the protective tube is fixed to the covering member by the engagement rib. The electric wire led out from the end portion of the protective tube is fixed to the placement surface of the wire support portion by the tie band. Therefore, relative movement of the electric wire with respect to the bottom plate portion is restricted inside the body portion of the covering member. Accordingly, the electric wire is less likely to rub against the wire support portion, and the insulation coating is prevented from being damaged due to sliding contact.

According to the protective tube connection structure of the present invention, the damage dealt to the electric wire due to the vehicle vibration or the like can be reduced.

The present invention has been briefly described above. Details of the present invention are further clarified by reading a mode for carrying out the present invention described below (hereinafter, referred to as "embodiment") with reference to the accompanying drawings.

DESCRIPTION OF EMBODIMENTS

An embodiment of the present invention will be described below with reference to the drawings.

Figure 1:
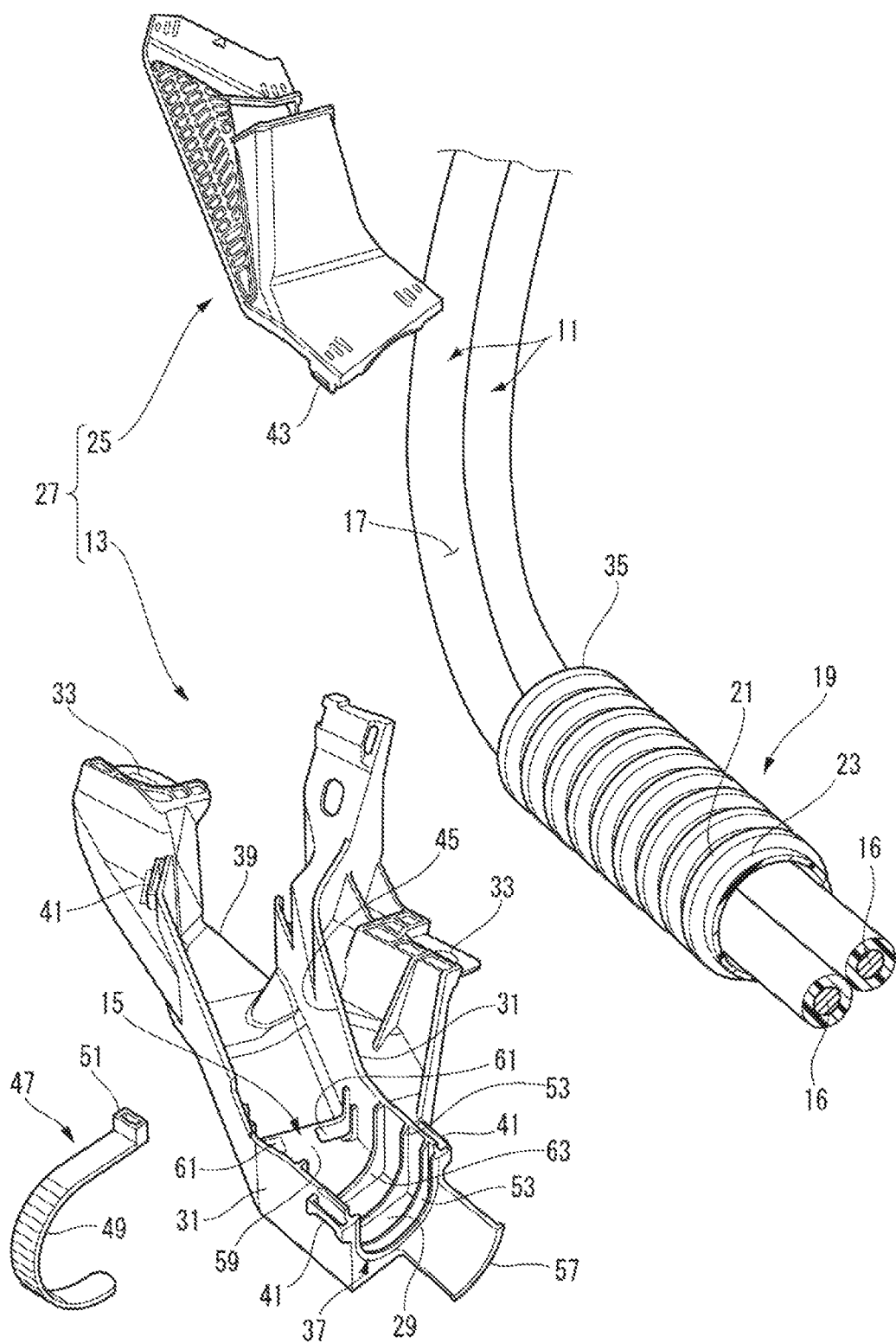
FIG. 1 is an exploded perspective view of a protective tube connection structure according to an embodiment of the present invention.

FIG. 1 is an exploded perspective view of a protective tube connection structure according to an embodiment of the present invention.

As shown in FIG. 1, the protective tube connection structure according to the embodiment of the present invention includes, as main components, an electric wire 11, a corrugated tube 19 serving as a protective tube, a body portion 13 of a protector 27 serving as a covering member, and a wire support portion 15 provided in the body portion 13.

The electric wire 11 is an insulated wire formed by covering an inner core wire 16 with an insulation coating 17 made of insulating resin. There may be one electric wire 11 or a plurality of electric wires 11. A plurality of electric wires 11 may be bundled with ends thereof attached to a connector or the like, so as to form a wire harness.

The protective tube used in the present embodiment is the corrugated tube 19. The corrugated tube 19 is formed by insulating hard resin in a bellows shape, and is alternately provided with large diameter portions 21 and small diameter portions 23. The electric wire 11 is inserted inside the corrugated tube 19.

In the present embodiment, the protector 27 serving as the covering member includes the body portion 13 which is made of insulating resin and a lid body 25. The covering member is not limited to the protector 27 according to the present embodiment. The covering member may also be a fuse box, an electric connection box, or the like as long as the covering member includes a housing shaped body portion to which the corrugated tube 19 is connected and the electric wire 11 is wired.

The protector 27 is formed in a complicated shape in accordance with a route toward a vehicle panel or an electrical component attached to the vehicle panel. In the present embodiment, the body portion 13 of the protector 27 is integrally formed with a pair of substantially parallel side plate portions 31 standing upright on two side portions of a bottom plate portion 29 which is bent at a plurality of locations. The pair of side plate portions 31 stands upright on the two side portions of the bottom plate portion 29, so that the body portion 13 has a gutter shape whose upper portion is opened along the bottom plate portion 29. A plurality of bolt fixing portions 33 configured to fix the protector 27 to a vehicle panel or the like by bolts are formed outside the side plate portions 31.

The protector 27 fixes an end portion 35 of the corrugated tube 19, and the electric wire 11 led out from the end portion 35 is disposed inside the protector 27. One end of the body portion 13 in an extending direction of the bottom plate portion 29 serves as a tube fixing portion 37 that fixes the end portion 35 of the corrugated tube 19. The other end of the body portion 13 in the extending direction of the bottom plate portion 29 serves as a wire lead-out opening 39 that guides the electric wire 11 led out from the end portion 35 and disposed inside the protector 27 to the outside of the protector 27.

The body portion 13 includes a plurality of locking portions 41 on outer surfaces of each side plate portion 31. A plurality of locking claws 43, which are suspended from the lid body 25 and provided corresponding to the locking portions 41, are locked to the locking portions 41. The locking claws 43 are locked to the locking portions 41, so that an upper opening 45 between the pair of side plate portions 31 is closed, thus the lid body 25 is fixed to the body portion 13. Accordingly, the protector 27 covers the electric wire 11 led out from the end portion 35 between the tube fixing portion 37 and the wire lead-out opening 39 and protects the electric wire 11 from scratching.

Inside the body portion 13, the electric wire 11 led out from the end portion 35 of the corrugated tube 19 is fixed to the bottom plate portion 29 by a tie band 47 serving as a binding member. The tie band 47 includes a buckle portion 51 at a base end of a flexible belt 49. By passing a tip end of the belt 49 through an insertion hole of the buckle portion 51, the tie band 47 binds a plurality of electric wires 11 and fixes the plurality of electric wires 11 to the bottom plate portion 29. The belt 49 is restricted from slip-off by a slip-off stopping piece formed in the insertion hole of the buckle portion 51.

Figure 2:
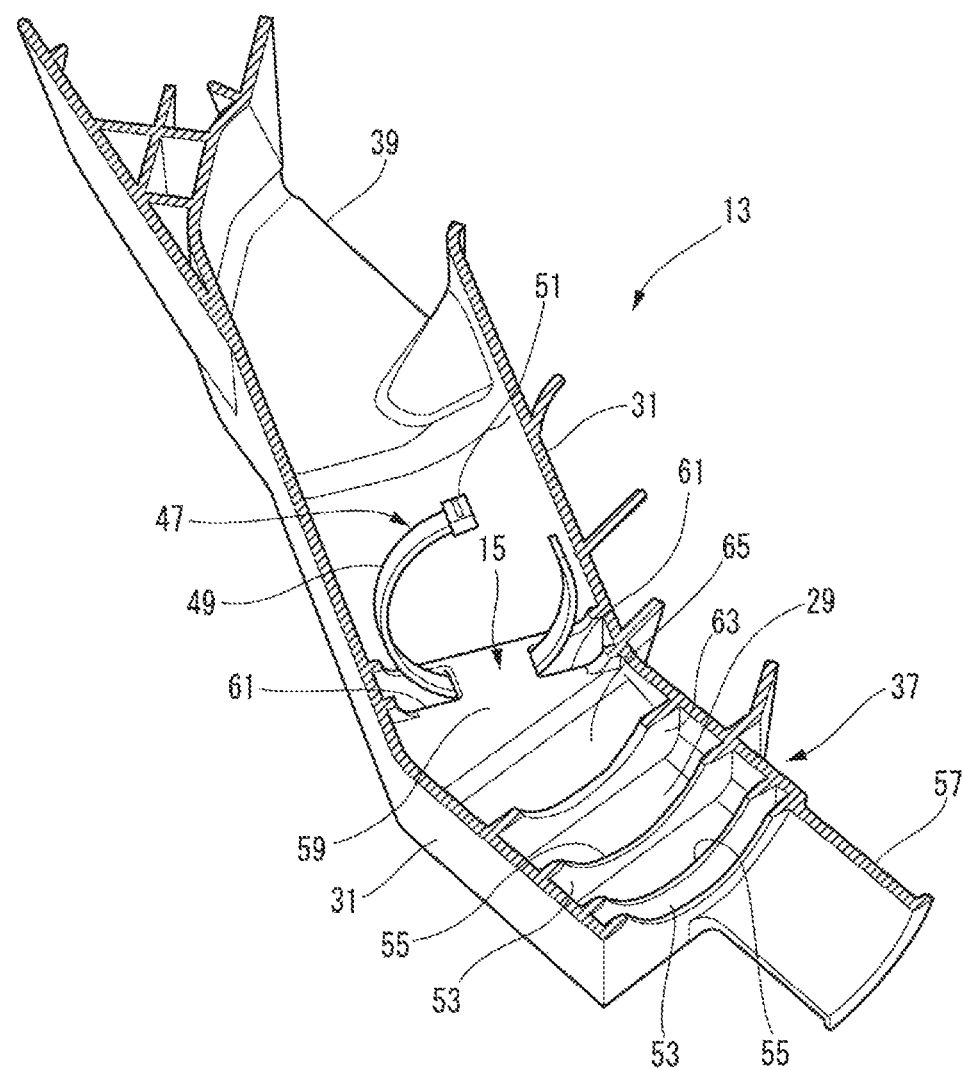
FIG. 2 is a partially cutaway perspective view of a body portion of a covering member shown in FIG. 1.

FIG. 2 is a partially cutaway perspective view of the body portion 13 of the protector 27 shown in FIG. 1.

A plurality of (for example, two) engagement ribs 53 are formed in the tube fixing portion 37 of the body portion 13 in a manner of being spaced apart from each other along a longitudinal direction of the corrugated tube 19. The engagement rib 53 protrudes from an inner periphery of the tube fixing portion 37 and includes an arc-shaped cutout portion 55. The cutout portion 55 of the engagement rib 53 is engaged with the small diameter portion 23 of the corrugated tube 19 from an outer peripheral side, thereby stopping the corrugated tube 19 from slip-off and fixing the corrugated tube 19. The body portion 13 is provided with a fixing piece 57 extending along the corrugated tube 19 at an outer end of the tube fixing portion 37. The corrugated tube 19 can be fixed to the fixing piece 57 by tape winding outside the body portion 13.

The wire support portion 15 is provided on the bottom plate portion 29 of the body portion 13. The wire support portion 15 is provided on the bottom plate portion 29 vertically below the body portion 13 that fixes the end portion 35 of the corrugated tube 19. The electric wire 11 led out from the end portion 35 is placed on the wire support portion 15 at first. Being vertically below means being on a lower side in a vertical direction in a state where the protector 27 is fixed to a vehicle panel or the like. Therefore, the electric wire 11 is placed on the wire support portion 15 provided on the bottom plate portion 29, and is supported against gravity.

The wire support portion 15 includes a flat placement surface 59 provided along the bottom plate portion 29. Since the placement surface 59 is formed to be flat, the insulation coating 17 can be less likely to be damaged when the electric wire 11 contacts the placement surface 59. Here, the placement surface 59 is a flat surface having at least a predetermined length in a direction along the longitudinal direction of the corrugated tube 19. The predetermined length is preferably equal to or more than a coating thickness of the insulation coating 17 of the electric wire 11, and is more preferably a half or more of an outer diameter of the electric wire 11, for example.

The wire support portion 15 according to the present embodiment includes a pair of band insertion holes 61 that communicate two sides of the tie band 47 wound along an outer periphery of the placed electric wire 11. The two sides of the tie band 47 wound along the outer periphery of the electric wire 11 communicate through the pair of band insertion holes 61.

An abutment protrusion 63 is provided on the bottom plate portion 29 of the body portion 13. The abutment protrusion 63 is provided between the end portion 35 of the corrugated tube 19 and the wire support portion 15. The abutment protrusion 63 abuts against the end portion 35 of the corrugated tube 19, so as to restrict the end portion 35 of the corrugated tube 19 from further entering the inside of the protector 27.

Figure 3:
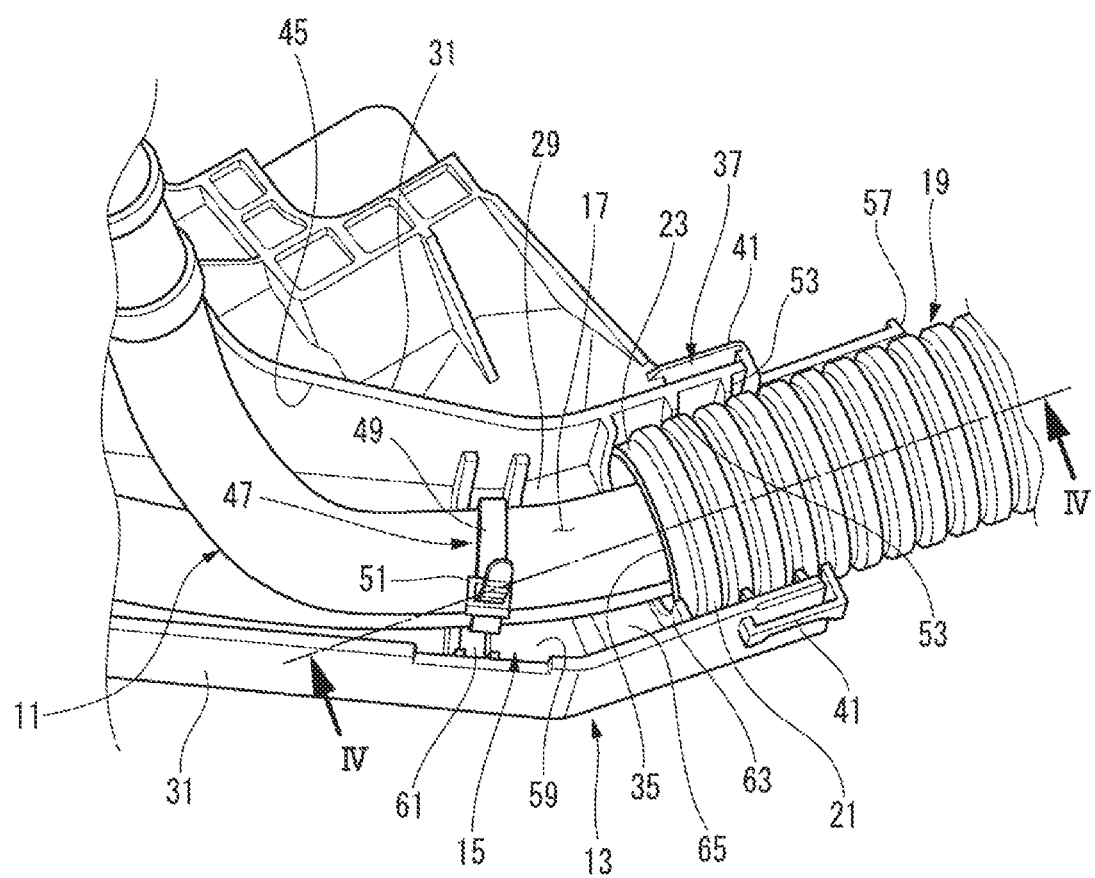
FIG. 3 is a perspective view of a main part of the protective tube connection structure shown in FIG. 1.

FIG. 3 is a perspective view of a main part of the protective tube connection structure shown in FIG. 1.

When the end portion 35 abuts against the abutment protrusion 63, the corrugated tube 19 is restricted from inserting into the inside, and the engagement rib 53 is engaged with an outer periphery of the small diameter portion 23, so that the tube fixing portion 37 is restricted from slip-off. The engagement rib 53 is also formed in the protector 27 on the lid body 25 corresponding to the tube fixing portion 37 (see FIG. 4). Accordingly, the lid body 25 is fixed to the body portion 13, so that almost an entire circumference of the small diameter portion 23 of the end portion 35 is engaged with the engagement rib 53, and the corrugated tube 19 is reliably stopped from slipping off from the protector 27.

Figure 4:
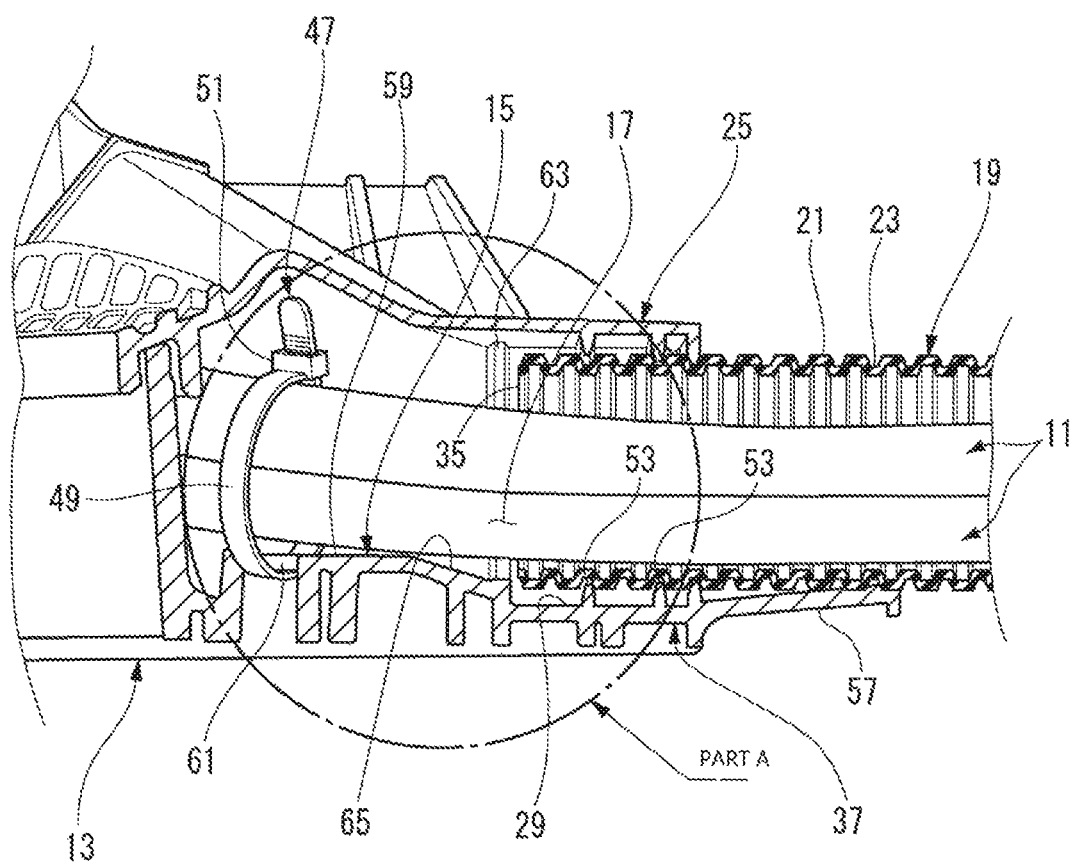
FIG. 4 is a cross-sectional view taken along line IV-IV in FIG. 3.

FIG. 4 is a cross-sectional view taken along line IV-IV in FIG. 3.

The placement surface 59 of the wire support portion 15 is located vertically above the inner surface of the small-diameter portion 23 on an endmost side of the corrugated tube 19 and thus provided on the bottom plate portion 29 of the body portion 13. That is, the electric wire 11 led out from the end portion 35 of the corrugated tube 19 is bent and inclined upward toward the wire support portion 15. Due to this inclination, the electric wire 11 is disposed at a floating position spaced apart from the inner surface of the small diameter portion 23 at the end portion 35 of the corrugated tube 19.

The abutment protrusion 63 protrudes vertically upward from the bottom plate portion 29, and an upper end thereof is disposed vertically below the inner surface of the small diameter portion 23. Therefore, the electric wire 11 led out from the end portion 35 does not contact an upper end of the abutment protrusion 63.

The placement surface 59 is provided continuously with an inclined surface 65 which is inclined downward toward the end portion 35. Therefore, a corner portion 67 formed by intersection of the placement surface 59 and the inclined surface 65 has an obtuse angle.

Next, an effect of the protective tube connection structure according to the present embodiment will be described.

Figure 5:
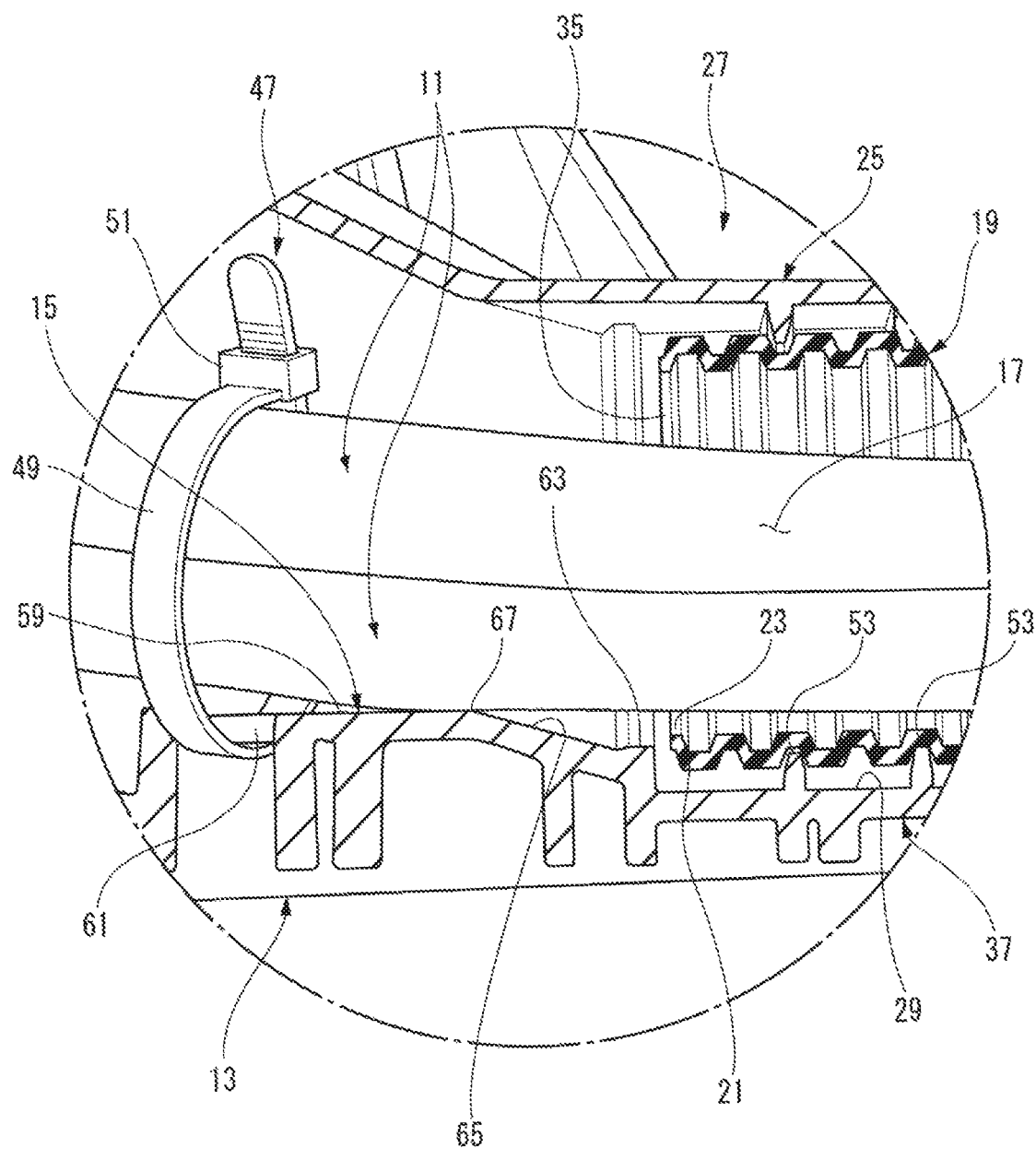
FIG. 5 is an enlarged view of part A of FIG. 4.
Figure 6A:
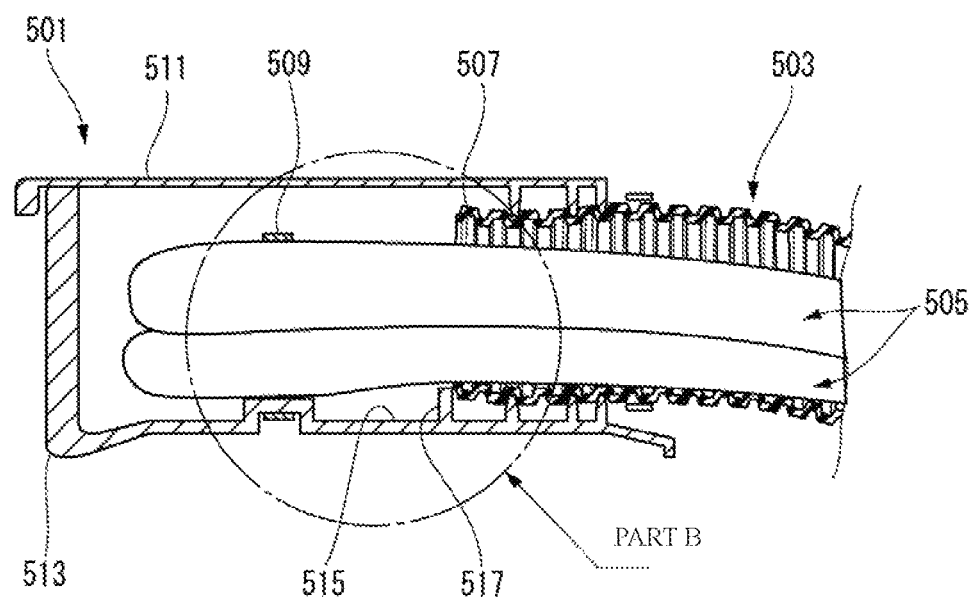
FIG. 6A is a cross-sectional view showing a protective tube connection structure in related art.
Figure 6B:
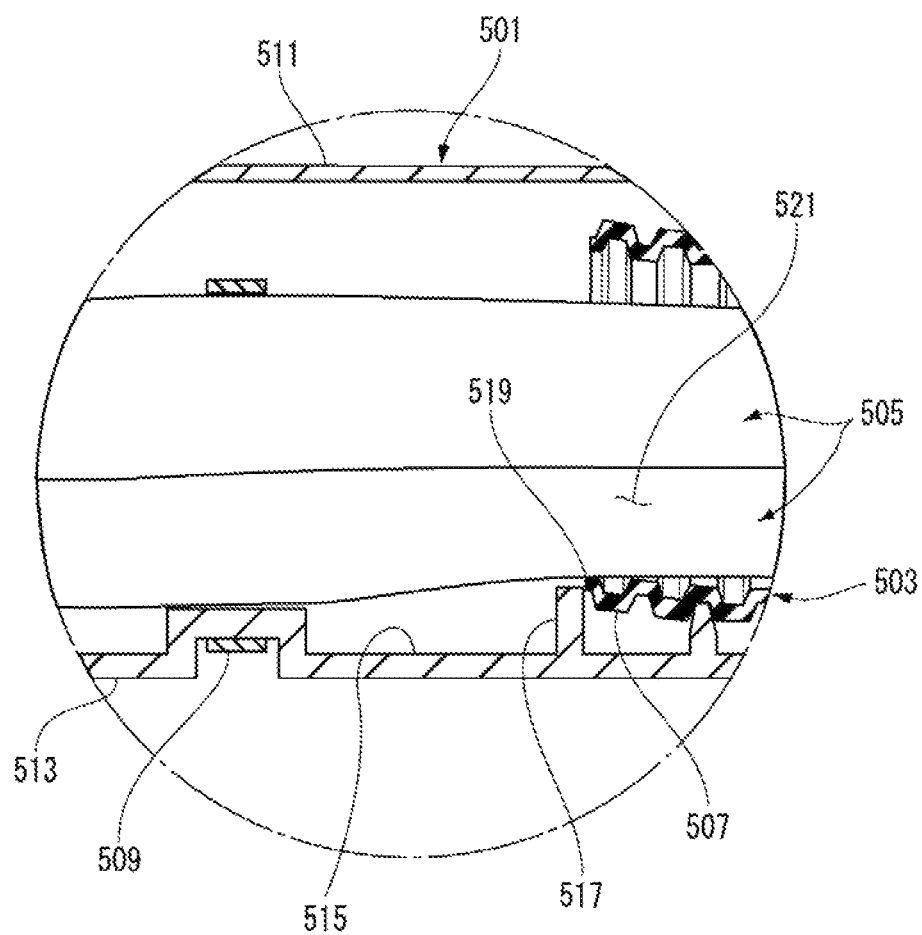
FIG. 6B is an enlarged view of part B of FIG. 6A.

FIG. 5 is an enlarged view of part A of FIG. 4.

In the protective tube connection structure according to the present embodiment, the corrugated tube 19 made of hard resin is alternately provided with the large diameter portions 21 and the small diameter portions 23. The electric wire 11 is inserted into the corrugated tube 19. The end portion 35 of the corrugated tube 19 is fixed to the protector 27. As for fixing of the corrugated tube 19 to the protector 27, the arc-shaped engagement rib 53 protruding from the inner periphery of the tube fixing portion 37 of the protector 27 is engaged with the small diameter portion 23 of the corrugated tube 19 from the outer peripheral side, thereby stopping the corrugated tube 19 from slip-off and fixing the corrugated tube 19. The electric wire 11 contacts the inner surface of the small diameter portion 23 among the large diameter portion 21 and the small diameter portion 23 inside the corrugated tube 19 due to action of gravity, and is thus supported.

The corrugated tube 19 is formed in a long shape and is cut into a predetermined length. A cutting direction at this time is a direction orthogonal to a central axis. When the corrugated tube 19 is cut in the direction orthogonal to the central axis, a cutting edge protrudes radially inward on a starting end side of the cutting direction, and protrudes radially outward on a terminal end side. Since the corrugated tube 19 is made of hard resin, the cutting edge may be sharp. When the end portion 35 of the corrugated tube 19 is the small diameter portion 23, the electric wire 11 faces the inner surface of the small diameter portion 23. In order to ensure cutting workability, the end portion 35 of the corrugated tube 19 is allowed to be either the small diameter portion 23 or the large diameter portion 21. At this time, when a lower edge of the small diameter portion 23 located vertically below is the starting end side of the cutting direction, the cutting edge protrudes radially inward. That is, at the end portion 35 of the corrugated tube 19, the cutting edge may bite into the insulation coating 17 of the electric wire 11.

Therefore, the protector 27 according to the present embodiment includes the wire support portion 15 on the bottom plate portion 29 of the body portion 13 that fixes the end portion 35 of the corrugated tube 19. The bottom plate 29 is located vertically below the body portion 13. The engagement rib 53 protrudes upward in the vertical direction on the bottom plate portion 29. An upper end of the engagement rib 53 enters and engages with the outer periphery of the small diameter portion 23 which is formed in a valley shape between adjacent large diameter portions 21 of the protective tube 19. The end portion 35 of the corrugated tube 19 fixed to the body portion 13 of the protector 27 is slightly floated from the bottom plate portion 29 due to the engagement rib 53. Therefore, the electric wire 11 led out from the end portion 35 of the corrugated tube 19 is floated by a predetermined distance from the bottom plate portion 29.

The bottom plate portion 29 is provided with the wire support portion 15 spaced apart from the end portion 35 of the corrugated tube 19 in a lead-out direction of the electric wire 11. Accordingly, the electric wire 11 led out from the end portion 35 is placed on the wire support portion 15 at first. The wire support portion 15 is formed to be higher than the inner surface of the small diameter portion 23 so as to be located vertically above the inner surface of the small-diameter portion 23 on the endmost side of the corrugated tube 19. That is, the electric wire 11 led out from the end portion 35 of the corrugated tube 19 is bent and inclined upward toward the wire support portion 15. Due to this inclination, the electric wire 11 is disposed at the floating position spaced apart from the inner surface of the small diameter portion 23 at the end portion 35. As a result, even when the cutting edge rises vertically upward from the lower edge of the small diameter portion 23, interference of the cutting edge with the electric wire 11 is avoided or biting thereof is mitigated.

In the protective tube connection structure according to the present embodiment, the abutment protrusion 63 protruding upward vertically from the bottom plate portion 29 is provided between the end portion 35 of the corrugated tube 19 and the wire support portion 15 of the body portion 13. The upper end of the abutment protrusion 63 is disposed vertically below the inner surface of the small diameter portion 23. Therefore, the electric wire 11 led out from the end portion 35 of the corrugated tube 19 does not contact the upper end of the abutment protrusion 63 of the body portion 13. Accordingly, the electric wire 11 is led out from the end portion 35 of the corrugated tube 19 and placed on the wire support portion 15 of the body portion 13 at first. The abutment protrusion 63 abuts against the end portion 35 of the corrugated tube 19, so as to restrict the end portion 35 of the corrugated tube 19 from further entering the inside of the protector 27. The abutment protrusion 63 is lower than the inner surface of the small diameter portion 23, and the electric wire 11 led out from the end portion 35 of the corrugated tube 19 is placed on the wire support portion 15. Therefore, the abutment protrusion 63 does not interfere with the electric wire 11. Accordingly, the abutment protrusion 63 can reliably restrict the corrugated tube 19 from entering the inside of the protector 27.

In the protective tube connection structure of the present embodiment, the wire support portion 15 includes the flat placement surface 59 along the bottom plate portion 29. Since the placement surface 59 is formed to be flat, the insulation coating 17 is less likely to be damaged when the electric wire 11 contacts the placement surface 59. That is, a pressing force per unit area received by the electric wire 11 from the placement surface 59 is smaller than a pressing force received in a case where a tip end of a rib is pointed. Accordingly, plastic deformation or damage is less likely to occur on the insulation coating 17 of the electric wire 11.

The placement surface 59 preferably has a length of at least equal to or more than a diameter of the electric wire 11 in a direction along the electric wire 11, and a length equal to or more than a radius of the electric wire 11 in a direction orthogonal to the electric wire 11. Accordingly, the wire support portion 15 can reliably reduce stress concentration generated on the insulation coating 17 due to contact with the placement surface 59 caused by an external force generated by vehicle vibration or the like.

In the protective tube connection structure of the present embodiment, the inclined surface 65 is continuously provided between the placement surface 59 of the wire support portion 15 and the end portion 35 of the corrugated tube 19 so as to be inclined downward from the placement surface 59 toward the end portion 35. That is, the inclined surface 65 is inclined upward from the end portion 35 toward the placement surface 59 of the wire support portion 15. Accordingly, the electric wire 11 led out from the end portion 35 of the corrugated tube 19 contacts the corner portion 67 of the obtuse angle formed by the intersection of the placement surface 59 and the inclined surface 65. As a result, the insulation coating 17 of the electric wire 11 is less likely to be deformed or damaged as compared with a case where the electric wire 11 contacts the corner portion 67 of a right angle or an acute angle.

In the protective tube connection structure of the present embodiment, the wire support portion 15 includes the pair of band insertion holes 61 on the placement surface 59 on which the electric wire 11 is placed. The two sides of the tie band 47 wound along the outer periphery of the electric wire 11 communicate through the pair of band insertion holes 61. That is, the wire support portion 15 serves as a tie band fixing portion in which the electric wire 11 is fixed to the placement surface 59 by the tie band 47. As described above, the corrugated tube 19 is fixed to the protector 27 by the engagement rib 53. The electric wire 11 led out from the end portion 35 of the corrugated tube 19 is fixed to the placement surface 59 of the wire support portion by the tie band 47. Therefore, relative movement of the electric wire 11 with respect to the bottom plate portion 29 is restricted inside the body portion 13 of the protector 27. Accordingly, the electric wire 11 is less likely to rub against the wire support portion 15, and the insulation coating 17 is prevented from being damaged due to sliding contact.

Therefore, according to the protective tube connection structure according to the present embodiment, the damage dealt to the electric wire due to the vehicle vibration or the like can be reduced.

The present invention is not limited to the above embodiment, and modifications, improvements, and the like can be made as appropriate. In addition, the material, shape, size, number, arrangement position, and the like of each component in the above embodiment are optional and are not limited as long as the present invention can be achieved.

Features of the embodiment of the protective tube connection structure according to the present invention will be briefly summarized in the following [1] to [5].

[1] A protective tube connection structure includes: a protective tube (corrugated tube 19) through which an electric wire (11) is inserted, the protective tube being alternately provided with large diameter portions (21) and small diameter portions (23);

a covering member (protector 27) where an end portion (35) of the protective tube is fixed, the electric wire led out from the end portion being disposed inside the body portion, in which a wire support portion (15) is provided on a bottom plate portion (29) vertically below the covering member such that the electric wire led out from the end portion is placed on the wire support portion at first and the wire support portion is located vertically above an inner surface of the small-diameter portion on an endmost side.

[2] The protective tube connection structure according to [1], in which an abutment protrusion (63) is provided on the bottom plate portion (29) of the covering member, the abutment protrusion (63) protrudes upward vertically from the bottom plate portion (29), and an upper end thereof is disposed vertically below the inner surface of the small diameter portion (23).

[3] The protective tube connection structure according to [1] or [2], in which the wire support portion (15) includes a flat placement surface (59) provided along the bottom plate portion (29).

[4] The protective tube connection structure according to [3], in which the placement surface (59) is provided continuously with an inclined surface (65) which is inclined downward toward the end portion (35).

[5] The protective tube connection structure according to any one of [1] to [4], in which the wire support portion (15) includes a pair of band insertion holes (61) that communicate two sides of a tie band (47) wound along an outer periphery of the placed electric wire (11).

What is claimed is:

1. A protective tube connection structure comprising:
a protective tube through which an electric wire is inserted and has alternately large diameter portions and small diameter portions; and
a covering member where an end portion of the protective tube is fixed, the electric wire led out from the end portion being disposed inside a body portion of the covering member,
wherein a wire support portion is provided as a portion of a bottom plate portion of the body portion vertically below a lid portion of the covering member such that the electric wire led out from the end portion of the protective tube is placed on the wire support portion at first and the wire support portion is located vertically above an inner surface of the small-diameter portion on an endmost side of the protective tube,
wherein the wire support portion includes a flat placement surface provided along the bottom plate portion,
wherein the placement surface is provided continuously with an inclined surface, which is provided on the bottom plate portion, and which is inclined downward toward the end portion, and
wherein the bottom plate portion includes a step-up portion positioned between the wire support portion and the end portion of the protective tube wherein a first end of the step-up portion connected to the inclined surface and a second end of the step-up portion opposite to the first end of step-up portion connected to the bottom plate portion.

2. The protective tube connection structure according to claim 1,
wherein an abutment protrusion is provided on the bottom plate portion of the body portion, and
wherein the abutment protrusion protrudes upward vertically from the bottom plate portion, and an upper end of the abutment protrusion is disposed vertically below the inner surface of the small diameter portion.

3. The protective tube connection structure according to claim 1,
wherein the wire support portion includes a pair of band insertion holes so as to communicate two sides of a tie band wound along an outer periphery of the placed electric wire.

* * * * *